Oct. 19, 1965   E. M. EADIE, JR   3,213,366
PLURAL RANGE HOOK-ON ELECTRICAL METER WITH ADJUSTABLE
MAGNETIC SHUNT AND RANGE SETTING COIL
Filed Sept. 1, 1961   2 Sheets-Sheet 1

INVENTOR.
EDWARD M. EADIE, Jr.
BY
Irving M. Freedman
HIS ATTORNEY

INVENTOR.
EDWARD M. EADIE, Jr.
BY
Irving M. Freedman
HIS ATTORNEY

United States Patent Office 3,213,366
Patented Oct. 19, 1965

3,213,366
PLURAL RANGE HOOK-ON ELECTRICAL METER WITH ADJUSTABLE MAGNETIC SHUNT AND RANGE SETTING COIL
Edward M. Eadie, Jr., Topsfield, Mass., assignor to General Electric Company, a corporation of New York
Filed Sept. 1, 1961, Ser. No. 135,483
10 Claims. (Cl. 324—127)

The subjecting invention relates to an improved electrical measuring instrument of the hook-on type, and more particularly, to means for providing desired scale distribution characteristics in a hook-on ammeter-voltmeter.

Hook-on instruments generally have a magnetic yoke or core which can be opened, hooked over a conductor and closed thereover for current measuring purposes without cutting or otherwise disturbing the conductor. It is desirable to be able to utilize the hook-on instrument for the measuring of both alternating and direct current voltages in addition to the measurement of current without unduly complicating the instrument mechanism or scale.

It is an object of the present invention to provide an improved multi-range hook-on ammeter.

It is another object of the present invention to provide an improved hook-on ammeter which may be utilized for the measurement of alternating and direct current voltages on the same scale indicia ranges.

It is a further object of the present invention to provide an improved, yet rugged, simplified and inexpensive multi-range hook-on instrument requiring a minimum of parts.

It is a still further object of the present invention to provide an improved hook-on multi-range instrument having means to provide desired scale distribution characteristics.

Further objects and advantages of the present invention will become apparent as the following description proceeds and the features of novelty which characterize the invention will be pointed out with particularity in the claims annexed to and forming a part of this specification.

In accordance with one form of the invention a multi-range hook-on instrument having desired pointer deflection characteristics is provided by an instrument having a magnetic core which can be closed about a conductor for current measuring purposes. An indicator responsive to the magnetic flux in the core includes a rotatably mounted member which deflects in accordance with the magnetic flux which passes through an air gap defined by the core and in which the rotatably mounted member is mounted. A second gap is provided in the magnetic circuit and an adjustable magnetic shunt varier overlies both of the gaps. The magnetic shunt varier is of nonuniform configuration and is adjusted along a plane parallel to one passing through both of the gaps to vary the area of the shunt in the region of both gaps.

More particularly, the magnetic shunt varier may be of a planar tapered configuration spaced from the magnetic circuit.

Also, the rotatably mounted member may be a moving vane with the air gap within which it rotates being defined by pole pieces shaped and positioned to form a progressively diminishing gap between the pole faces and the edge of the moving vane as the vane is deflected. A coil is positioned about the core, a capacitor shunts the coil to provide substantially similar indications for both direct and alternating current measurements, and an impedance may be selectively shunted across the coil to provide an additional current range.

For a better understanding of the invention, reference may be had to the accompanying drawings in which.

Figure 1:
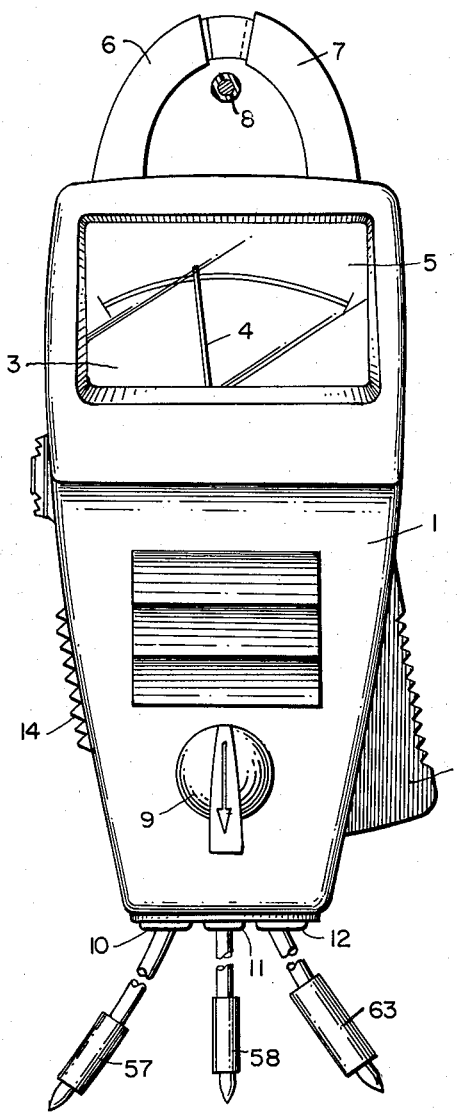
FIG. 1 is an elevation view showing a hook-on instrument embodying the invention.

Referring to FIG. 1, a hook-on instrument is shown comprising a case 1 having positioned therein an indicating instrument including a scale plate 3 and cooperating pointer 4 viewable through a transparent member 5. A pair of relatively movable yoke or core members 6 and 7 extend from one end of the housing 1 and are adapted to be closed about a conductor 8 to measure the current flow therethrough. The range changing switch 9 enables the selection of the desired range, and connections 10, 11 and 12 enable the connection of external leads for use in voltage and resistance measurements. Serrations 14 on the housing 1 provide a grip for holding the instrument.

Figure 2:
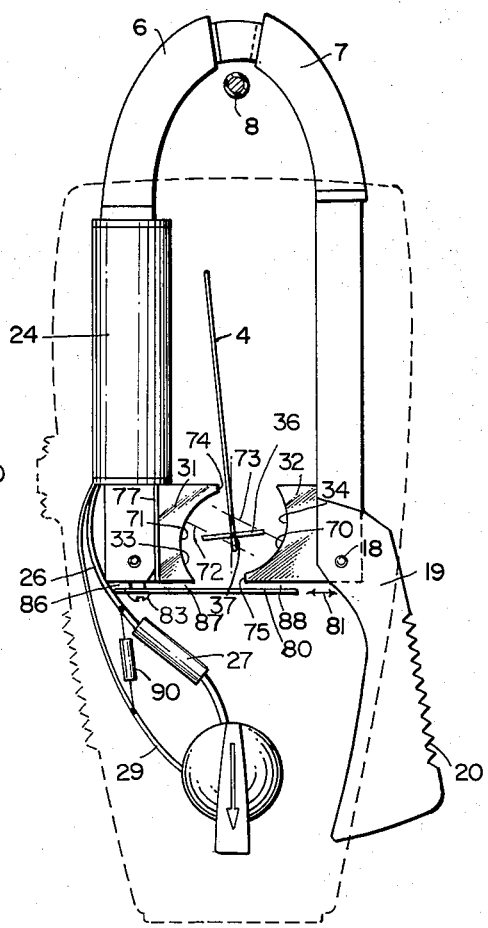
FIG. 2 is a partial view of the mechanism contained within the housing of FIG. 1 illustrating the magnetic circuitry associated with the invention.

Referring to FIG. 2, it will be seen that the magnetic core members 6 and 7, which may be of laminated construction in a manner well known in the art, are relatively movable such that the core may be opened by the rotation of member 7 about the pivot 18 in the clockwise direction. The movement or rotation of the core member 7 is facilitated by the nonmagnetic plastic extension 19 which is attached to the member 7 and which extends below the pivot 18. Extension 19 may be readily moved by pressure on the serrated trigger portion 20 which, as shown in FIG. 1, extends beyond the housing 1.

A coil 24 is positioned about a portion of the core member 6 and within the housing 1. One end of the coil 24 is connected through lead 26 and resistor 27 to one terminal of switch 9, while the other switch terminal is connected through lead 29 to the other side of the coil. Thus, coil 24 may be selectively shunted by resistor 27 through the action of switch 9. The connections are shown schematically in FIG. 3.

A pair of laminated magnetic pole pieces 31 and 32 extend toward one another from the inner edges of the core members 6 and 7 and provide a pair of opposed arcuate pole faces 33 and 34 having positioned therebetween a vane member 36 rotatably mounted about the axis 37. Pointer 4 is secured to the vane 36 for rotation therewith.

Pole faces 33 and 34 are shaped and disposed relative to the radial vane 36 so as to form progressively diminishing gaps between the end or tips of the vane and the pole faces as the vane rotates in a clockwise direction. The pole faces 33 and 34 have circular arced portions 70 and 71 disposed such that the respective center lines or perpendicular bisectors of the arced portions are parallel but on opposite sides of the axis 37 of the rotatably mounted vane 36. The remainder 74 of the pole piece 70, and 75 of the pole piece 71, are substantially planar portions at the top and bottom regions of their respective pole faces. Thus, as the rotatably mounted vane 36 rotates in a clockwise direction the air gap between the vane and the pole faces 33 and 34 progressively diminishes thus providing an attraction instrument of the radial vane type having only a single vane.

For the measurement of current, the core members 6 and 7 are clamped about a conductor 8 through which an electric current is passing inducing a magnetic field in the core members and through the region between the pole faces 33 and 34. The magnitude of the magnetic field appearing across the pole faces will be related to the magnitude of the current flow through the conductor 8 and, accordingly, the deflection of the vane 36 and the attached pointer 4 will be related to and indicative of the magnitude of the current flow through the conductor 8. The vane 36 deflects through the magnetic attraction provided by the movement of the vane 36 in aligning itself with the magnetic flux produced in the gap between the pole faces 33 and 34.

Coil 24, which may be selectively shunted through the action of switch 9 by resistor 27, provides a back magnetomotive force or M.M.F. which opposes the "forward" M.M.F. produced in the cores 6 and 7 by the current flow in the conductor 8. This arrangement provides a simplified multi-range ammeter and is described in more detail in the copending patent application of Myron S. Wilson, Ser. No. 135,484 filed concurrently herewith and assigned to the same assignee as the subject application. The aforementioned patent application of Myron S. Wilson also describes in detail an arrangement for utilizing coil 24 to provide resistance measurements in addition to alternating and direct current voltage measurements. Reference may be had to that application for a more detailed discussion of the provision of multi-ranges for the current measurements in addition to voltage and resistance measurements.

Figure 3:
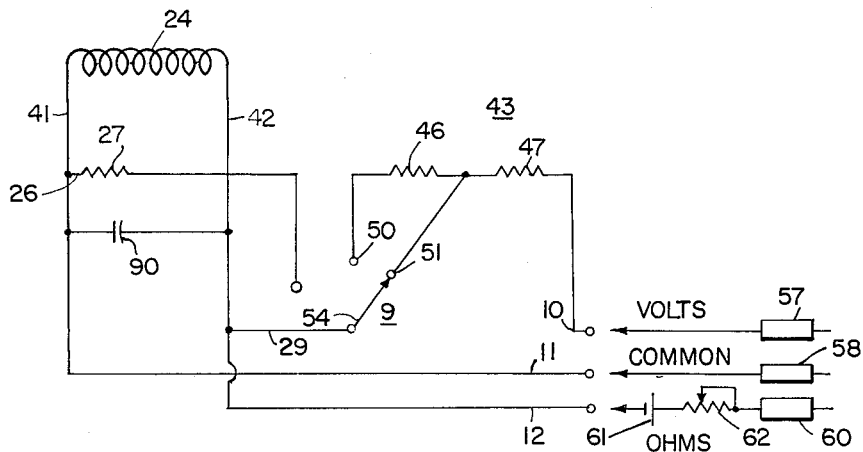
FIG. 3 is a circuit diagram in schematic form illustrating the electrical connections and components associated with the invention.

Referring to FIG. 3, one end 41 of the coil 24 is connected directly to a common terminal or connection 11 which, as shown in FIG. 1, is physically located at the bottom of the housing 1. The other side 42 of the coil 24 is connected to the wiper 54 of switch 9 which is utilized in variable resistor switching arrangement 43. The variable resistor switching arrangement 43 includes fixed resistors 46 and 47 electrically connected in series with one end in the series arrangement connected to the volts terminal 10 physically located at the bottom of the housing 1. The other end of the series resistor arrangement is connected to terminal 50 of switch 9, while the junction between resistors 46 and 47 is connected to terminal 51 of the switch. Thus, the ends of the coil 24 are connected in series with variable resistor 43 to terminals 10 and 11. Connectors or probes 57 and 58 may be selectively connected to the terminals 10 and 11 for connection across the points whose voltage differential is to be measured. The voltage under measurement will cause a current flow through coil 24 in accordance with the magnitude thereof to provide a magnetic field through the pole pieces 31 and 32 and cause a pointer 4 deflection in accordance with the magnitude of the voltage under measurement. Adjustment of switch 9 selectively controls the magnitude of the resistance in series with coil 24 to provide the desired voltage range. The probes 57 and 58 may be removed from the terminals 10 and 11 when the instrument is not being utilized for voltage measurements.

One problem encountered in the simplified instruments of the type described above is in providing means for adjusting the instrument for full scale. Shunting the coil 24 will not provide a suitable method for full scale adjustment.

A brass or nonmagnetic plate 77 is inserted between the core 6 and the pole piece 31 to provide a gap therebetween. A tapered planar magnetic member or shunt gap varier plate 80 is adjustably positioned below the pole pieces 31 and 32 so as to overlie the gap formed between the core 6 and the pole piece 31 and the pole pieces 31 and 32, respectively. The direction of adjustment of member 80 is shown by arrow 81 in FIG. 2. The configuration and mounting arrangement for the magnetic shunt plate 80 is best shown in FIG. 4.

Figure 4A:
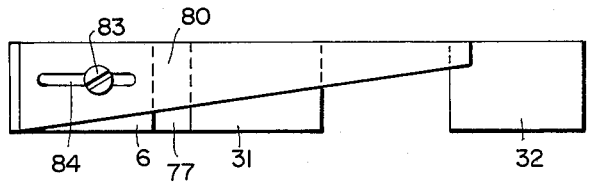
FIGS. 4a and 4b are bottom views of the arrangement shown in FIG. 2 showing the magnetic shunt varier in two different positions.
Figure 4B:
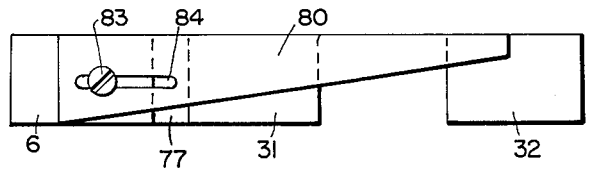

Referring to FIG. 4, the magnetic shunt plate 80 is tapered in a direction from core 6 toward the pole pieces 31 and 32, respectively, and is mounted upon the bottom of the pole piece 6 by a brass screw 83 which extends through a longitudinally extending slot 84 in the shunt 20. The slot enables adjustment of the shunt plate 80 in a direction parallel to a line passing along the bottom and through the centers of core 6 and pole pieces 31 and 32. FIG. 4b is similar to FIG. 4a and shows the position of the shunt plate 80 after it has been adjusted so as to be moved to the right of the position shown in FIG. 4a. Shunt gap varier plate 80 selectively varies the shunting effect and effective shunt gaps between the shunt plate and core 6, pole piece 31 and pole piece 32 which gaps are indicated as 86, 87 and 88 in FIG. 2.

The use of the magnetic shunt 80 increases the effectiveness if the electrically shunted coil 24 to change the alternating current ranges since more flux tends to flow through the coil than through the gap between the pole pieces 31 and 32 in which the rotatable vane 36 is mounted since the shunting of the air gap decreases the total circuit reluctance. This causes a larger back M.M.F. to be generated. Accordingly, in order to maintain a desired amount of range changing through the use of coil 24 a higher resistance should be shunted across the coil. However, increasing the total reluctance in series with the air gap, such as by increasing the reluctance of gap 86 between the gap varier and the core 6 causes a decrease in the effectiveness of the shunted coil 24 by decreasing the flux flowing therein such that the shunt resistance should be lowered to maintain the same range changing effect. The net result is that the full scale adjustment which will increase both the shunt and the gap simultaneously in the correct proportions will keep the effect of the coil 24 as a multiplier the same by maintaining the total flux induced in core 6 due to current flow in conductor 8, constant throughout the range of adjustment of shunt gap varier 80. That is, the multiplication effect of resistance 27 across the coil 24 will remain constant during the adjustment of the instrument for full scale. The shunt gap varier 80 accomplishes this desired result.

Use of the shunt gap varier 80 results in an arrangement that when the gap is adjusted to the position shown in FIG. 4b from that shown in FIG. 4a the effective shunt is increased while the effective gap is also increased. This may be more readily seen by the following relationships:

$$S = \frac{A_{87} + A_{88}}{1}$$

where

1 = the gap length
$S$ = the effective shunt
$A_{87}$ = the area of gap 87
$A_{88}$ = the area of gap 88 and $$G = \frac{1}{A_{77} + A_{86} + A_{87}}$$

where $G$ = the effective gap
$A_{77}$ = the area of the gap provided by the brass plate 77
$A_{86}$ = the area of gap 86

While the gap lengths need not be equal, for convenience of explanation in the above relationships it is assumed that the lengths of all gaps are equal and that all gaps are proportional to their length divided by their area and that all shunts are proportional to their area divided by their length.

Another problem encountered in a hook-on instrument utilizing an iron vane movement for use in both alternating and direct current measurements is a higher vane deflection and resulting scale indication is usually provided for a given value of direct current than for alternating current. This provides a problem since it is usually desired to have the same scale indicia for both alternating and direct current ranges. Compensation may be provided by decreasing the alternating current losses by the use of high nickel iron for pole pieces and hooks. However, such iron is expensive and difficult to utilize since it requires expensive heat treatments.

A simple, yet inexpensive, and efficient way of amplifying or increasing the A.-C. or alternating current response is to connect a capacitor across the coil 24 which is wound on the core 6. Coil 24, as pointed out above, is utilized in current measurements as a current multiplier and also as a volt coil for the measurement of alternating and direct current voltages. The capacitor 90, as shown in FIGS. 2 and 3, is connected directly across coil 24. With such an arrangement, the alternating and direct current voltage ranges show improved tracking ability and also provide deflection characteristics which enable the use of the same scales for both alternating and direct current voltages.

Capacitor 90 effectively amplifies the alternating current response. Such response is increased with increased capacity up to a certain point and then decreases so that with a very high capacity the capacitor acts as a short across the coil causing decreased sensitivity. Thus, the value of the capacitor should be selected to provide the desired amplification of the alternating current response.

The instrument described above fulfills the stated objects of the invention and provides a simple and inexpensive instrument having desired operating and scale distribution characteristics.

Therefore, while a particular embodiment of the subject invention has been shown and described herein, it is in the nature of description rather than limitation, and it will occur to those skilled in the art that various changes, modifications, and combinations may be made within the province of the appended claims and without departing either in spirit or scope from this invention in its broader aspects.

What I claim as new and desire to secure by Letters Patent of the United States is:

1. A multi-range instrument of the hook-on type comprising: a magnetic core having means for opening and closing the same for the purpose of closing the core about a conductor to induce flux therein for current measuring purposes, indicating means having first and second current scales and being magnetically coupled to said core by having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in said magnetic circuit in series with said air gap, a magnetic shunt varier overlying both said air gap and said second gap, said magnetic shunt being of nonuniform configuration, and means to enable selective adjustment of said shunt along a plane parallel to one passing through both of said gaps, said adjustment varying the area of said shunt in the region of both of said gaps.

2. A multi-range instrument of the hook-on type comprising: a magnetic core having means for opening and closing the same for the purpose of closing the core about a conductor to induce flux therein for current measuring purposes, indicating means having first and second current scales and being magnetically coupled to said core by having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in said magnetic circuit in series with said air gap, a planar magnetic shunt varier overlying both said air gap and said second gap, said magnetic shunt being of nonuniform tapered configuration, and means to enable selective adjustment of said shunt along a plane parallel to one passing through both of said gaps, said adjustment varying the area of said shunt in the region of both of said gaps.

3. A multi-range instrument of the hook-on type comprising: a magnetic core having means for opening and closing the same for the purpose of closing the core about a conductor to induce flux therein for current measuring purposes, indicating means having first and second current scales and being magnetically coupled to said core by having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in said magnetic circuit in series with said air gap, a planar magnetic shunt varier spaced from said magnetic circuit overlying both said air gap and said second gap, sad magnetic shunt being of nonuniform tapered configuration, and means to enable selective adjustment of said shunt along a plane parallel to one passing through both of said gaps, said adjustment varying the area of said shunt in the region of both of said gaps.

4. A multi-range ammeter-voltmeter instrument of the hook-on type comprising: a magnetic core having means for opening and closing the same for the purpose of closing the core about a conductor to induce flux therein for current measuring purposes, indicating means having first and second current scales and a voltage scale, said indicating means being magnetically coupled to said core by having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in said magnetic circuit in series with said air gap, said means to induce opposing flux comprising a coil wound on said core, and range switching means having first and second positions to selectively shunt said coil with different values of impedances to change said proportional relationship by controlling the magnitude of said opposing flux, a resistance, a pair of terminals, said range switching means having a third position for connecting said coil in series with said resistance across said terminals to which a voltage under measurement may be connected, a planar magnetic shunt varier spaced from said magnetic circuit overlying both said air gap and said second gap, said magnetic shunt being of nonuniform tapered configuration, and means to enable selective adjustment of said shunt along a plane parallel to one passing through both of said gaps, said adjustment varying the area of said shunt in the region of both of said gaps.

5. A multi-range ammeter-voltmeter instrument of the hook-on type comprising: a magnetic core having means for opening and closing the same for the purpose of closing the core about a conductor to induce flux therein for current measuring purposes, moving vane indicating means having first and second current scales and a voltage scale, said indicating means being magnetically coupled to said core by having a member rotatably mounted in an air gap located in series with said core, said member being responsive to the magnetic flux in said air gap, means to vary the measurement range of said indicating means comprising, a coil positioned about said core, and means to selectively shunt said coil to decrease the flux in said core and increase the current measurement range of said indicator means, a second gap in said magnetic circuit in series with said air gap, a resistance, a pair of terminals, and means for selectively connecting said coil in series with said resistance across said terminals to which a voltage under measurement may be connected, a planar magnetic shunt varier spaced from said magnetic circuit overlying both said air gap and said second gap, said magnetic shunt being of nonuniform tapered configuration, and means to enable selective adjustment of said shunt along a plane parallel to one passing through both of said gaps, said adjustment varying the area of said shunt in the region of both of said gaps, said pole faces being disposed and shaped so as to form a progressively diminishing gap between said pole faces and the edge of said moving vane as said vane is deflected, said pole faces being disposed such that the perpendicular bisectors thereof pass on opposite sides of the axis of said rotatably mounted vane.

6. A multi-range ammeter-voltmeter instrument of the hook-on type comprising: a magnetic core having means for opening and closing the same for the purpose of closing the core about a conductor to induce flux therein for current measuring purposes, indicating means having first and second current scales and a voltage scale, said indicating means being magnetically coupled to said core by having a member rotatably mounted in an air gap located in series with said core, said member being responsive to the magnetic flux in said air gap, means to vary the measurement range of said indicating means comprising, a coil positioned about said core, range switching means being operable to a first position to selectively shunt said coil to decrease the flux in said core and increase the current measurement range of said indicator means, a resistance, a pair of terminals, said range switching means being operable to a second position for selectively connecting said resistance in series with said coil across said terminals to which alternating or direct current voltages under measurement may be connected to selectively provide alternating and direct current voltage indications on said voltage scale, and a capacitor connected across said coil, the value of said capacitor being such as to provide substantially similar voltage indications for both direct and alternating current voltages to thereby allow both types of voltages to be read on the same voltage scale.

7. A multi-range ammeter-voltmeter instrument of the hook-on type comprising: a magnetic core having means for opening and closing the same for the purpose of closing the core about a conductor to induce flux therein for current measuring purposes, indicating means having a current scale and a voltage scale, said indicating means being responsive to the magnetic flux in said core, a coil positioned about said core, a resistance, a pair of terminals, switching means for selectively connecting said resistance in series with said coil across said terminals to which alternating and direct current voltages under measurement may be connected to selectively provide alternating and direct current voltage indications on said voltage scale, and a capacitor connected across said coil, the value of said capacitor being such as to provide substantially similar indications for both direct and alternating current measurements to thereby allow both types of volts to be read on the same voltage scale.

8. A multirange electrical instrument of the hook-on type comprising: a magnetic core having means for opening and closing the same for the purpose of closing the core about a conductor to induce flux therein for current measuring purposes, indicating means having first and second current scales and being magnetically coupled to said core and having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in series with said air gap, and means for adjusting the instrument for full scale by adjusting the flux traversing said air gap, the adjustment of said full scale adjusting means having no effect upon the magnitude of said current induced flux whereby the full scale adjustment of the instrument does not disturb the scale factor between said first and second current scales.

9. A multirange electrical instrument of the hook-on type comprising: a magnetic core having means for opening and closing the same for the purpose of closing the core about a conductor to induce flux therein for current measuring purposes, indicating means having first and second current scales and being magnetically coupled to said core and having a member rotatably mounted in an air gap located in series with said core, said member being responsive to the magnetic flux in said air gap, means coupled to said current induced flux to selectively induce opposing flux in said core the magnitude of which is proportional to the magnitude of said current induced flux, said proportional relationship determining the scale factor between said first and second scales, a second gap in series with said air gap, and means for adjusting the instrument for full scale by adjusting the flux traversing said air gap, said full scale adjusting means comprising a first adjustable gap in shunt with said air gap the adjustment of said full scale adjusting means having no effect upon the magnitude of said current induced flux whereby the full scale adjustment of the instrument does not disturb the scale factor between said first and second current scales.

10. The combination of claim 9 in which said full scale adjusting means further comprises a second adjustable gap in shunt with said second gap, said first and second adjustable gaps being controlled in common so that their reluctances vary in an inverse relationship so as to maintain the total reluctance introduced by said air gap, said second gap and said first and second adjustable gaps constant.

References Cited by the Examiner

UNITED STATES PATENTS

| 532,561 | 1/95 | Hoyt | 324—147 |
| 2,210,778 | 8/40 | Rowell | 324—117 |
| 2,266,624 | 12/41 | Hall | 324—127 |
| 2,309,927 | 2/43 | Beede | 324—151 |
| 2,327,114 | 8/43 | Lingel | 324—132 |
| 2,783,437 | 2/57 | Yenni | 324—129 |

References Cited by the Applicant

UNITED STATES PATENTS

| 497,448 | 5/93 | Hoyt. |
| 1,776,708 | 9/30 | St. Clair. |
| 2,218,376 | 10/40 | Corson. |
| 2,739,506 | 3/56 | Stimson et al. |
| 2,769,959 | 11/56 | Estoppey. |

WALTER L. CARLSON, *Primary Examiner.*

FREDERICK M. STRADER, *Examiner.*